Dec. 2, 1930.  I. M. CONWAY ET AL  1,783,407
MACHINE FOR CLEANING JOURNAL BOX WASTE
Filed April 28, 1927  4 Sheets-Sheet 1
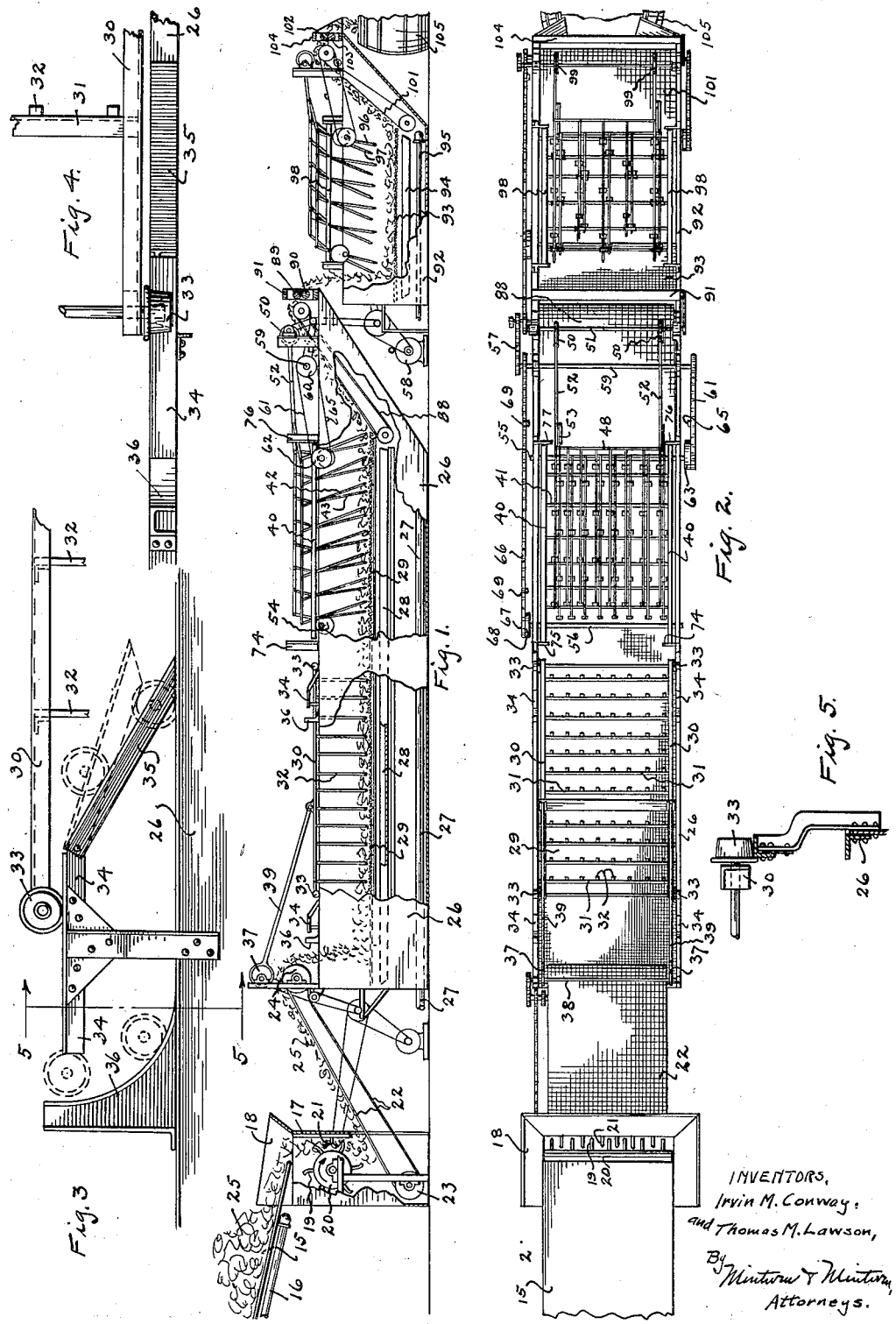
INVENTORS,
Irvin M. Conway,
and Thomas M. Lawson,
By Minturn & Minturn,
Attorneys.

Dec. 2, 1930.  I. M. CONWAY ET AL  1,783,407
MACHINE FOR CLEANING JOURNAL BOX WASTE
Filed April 28, 1927  4 Sheets-Sheet 2
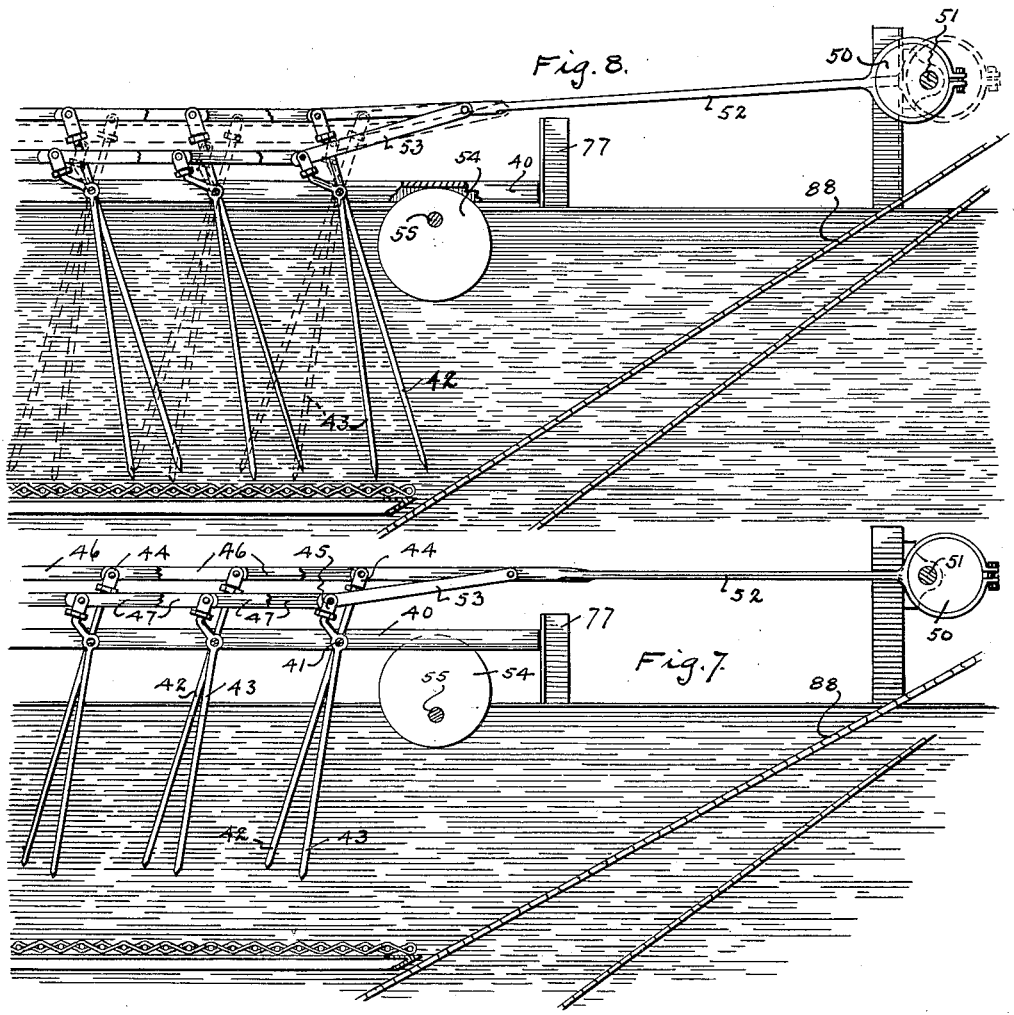
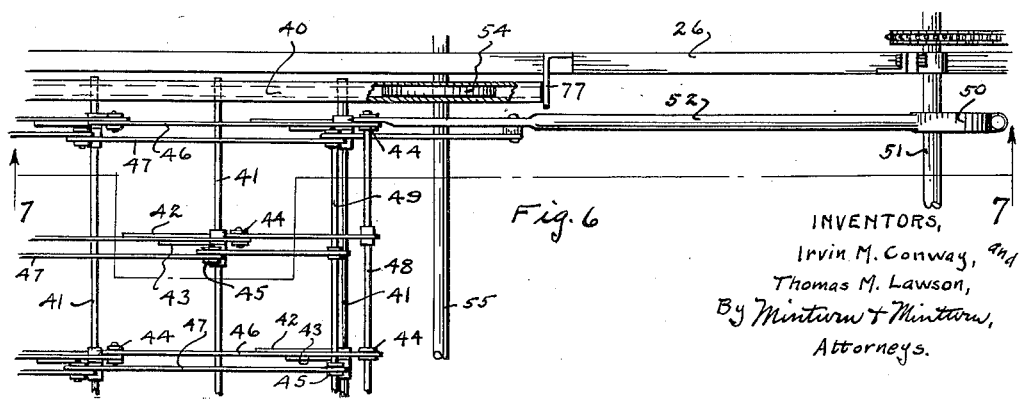

Dec. 2, 1930.  I. M. CONWAY ET AL  1,783,407
MACHINE FOR CLEANING JOURNAL BOX WASTE
Filed April 28, 1927   4 Sheets-Sheet 3
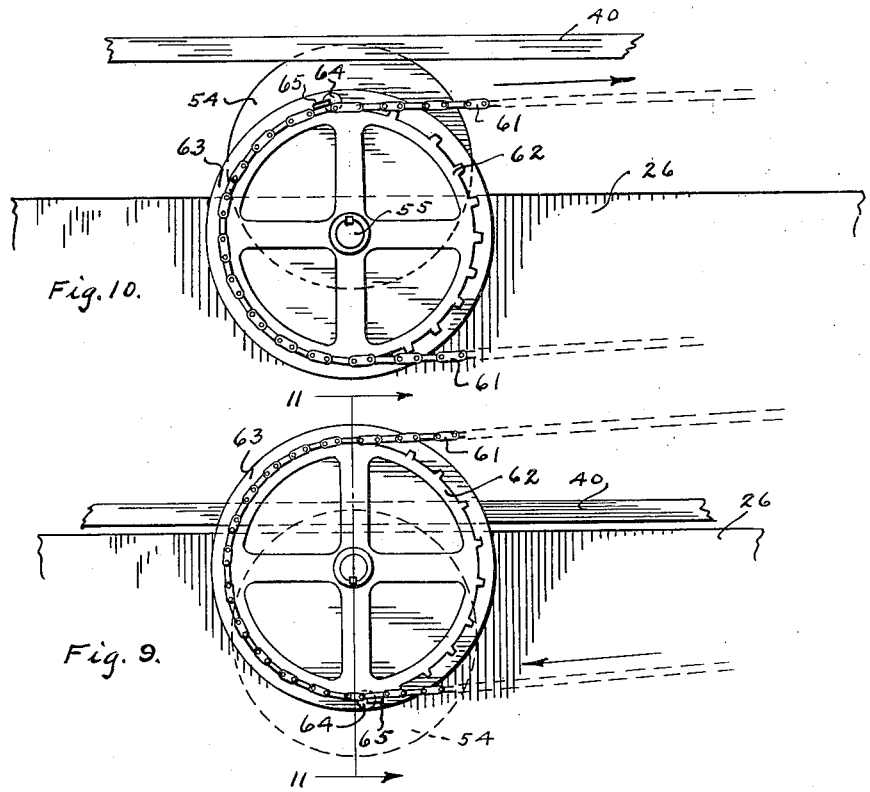
Fig. 10.
Fig. 9.
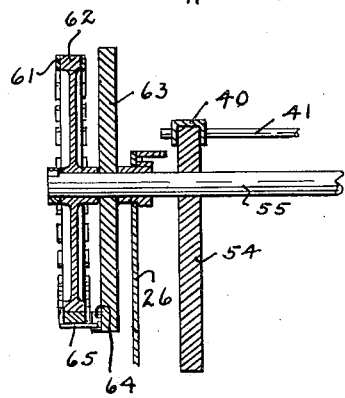
Fig. 11.
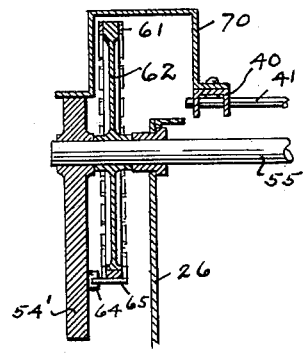
Fig. 12.
INVENTORS,
Irvin M. Conway, and
Thomas M. Lawson,
By Minturn & Minturn,
Attorneys.

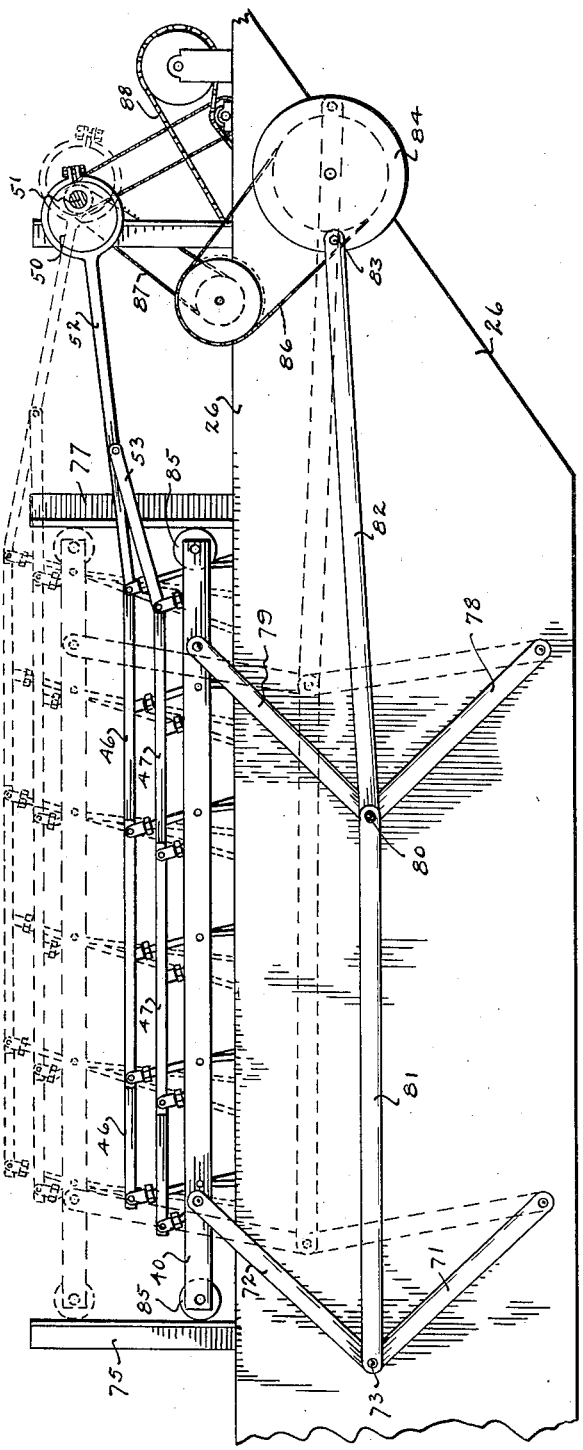

Patented Dec. 2, 1930

1,783,407

UNITED STATES PATENT OFFICE

IRVIN M. CONWAY AND THOMAS M. LAWSON, OF INDIANAPOLIS, INDIANA, ASSIGNORS TO JOURNAL-BOX SERVICING CORPORATION, OF INDIANAPOLIS, INDIANA, A CORPORATION OF INDIANA

MACHINE FOR CLEANING JOURNAL-BOX WASTE

Application filed April 28, 1927. Serial No. 187,318.

In many applications, journal-boxes, particularly in railroad cars, are packed with waste as a means of feeding oil to the bearing surfaces, and regular inspection and repacking of the journal-boxes must be made to keep the waste packed properly so as to contact the moving axle. After some service, the waste becomes stiff and caked or hardened and impregnated with particles of metal and grit with the result that proper and complete lubrication is no longer maintained.

The waste must then be removed and replaced with new waste and oil. On large railways, the matter of supplying new waste amounts to a considerable item in the maintenance cost. Moreover, new waste has been found to be not so good for journal-box usage as is waste that has been used previously and recleaned.

This invention relates to means for handling the waste removed from the journal-boxes in such a manner that the hardened or caked oil and grit and metal particles are removed and new oil is absorbed by the waste whereby the used waste is thoroughly recleaned and reconditioned for service again in the journal-boxes.

The invention is described with reference being made to the accompanying drawings, in which Fig. 1, is a fragmentary side elevation of the device for cleaning the waste;

Fig. 2, a top plan view of the device;

Fig. 3, a detail in elevation on an enlarged scale of the means for raising and lowering the agitating and conveying member;

Fig. 4, a top plan view of the detail shown in Fig. 3;

Fig. 5, a vertical section on the line 5—5 in Fig. 3;

Fig. 6, a fragmentary top plan view on an enlarged scale of a portion of the picking and conveying members;

Fig. 7, a vertical section on the line 7—7 in Fig. 6, with the picking members in the raised position;

Fig. 8, a vertical section also on the line 7—7 in Fig. 6, but showing the picking members in the lowered position;

Fig. 9, an enlarged detail in side elevation of the means for raising and lowering the picking members in the position when the members are lowered;

Fig. 10, a view similar to Fig. 9, but with the means turned to the position where the members are raised;

Fig. 11, a vertical section on the line 11—11 in Fig. 9;

Fig. 12, a vertical section taken on the line 11—11 in Fig. 9, but showing a modified form; and Fig. 13, a side elevation on an enlarged scale of one end of the waste cleaning device showing a modified form of the mechanism for raising and lowering the picking and conveying members.

Like characters of reference indicate like parts throughout the several views of the drawings.

Referring now in particular to Figs. 1 and 2, a raised platform or table 15 is provided with a steam pipe 16 thereunder so that waste 25 directly from the journal-boxes may be piled on the table 15 and heated to soften the hardened mass of waste. A picker 17 is located at one end of the table 15 and receives the waste as it is pushed off the table 15 after examination into the hopper 18 from which the waste drops to be carried by teeth 19 on the revolving cylinder 20 between stationary teeth 21 fixed to the picker wall. The waste upon passing thereby is loosened up and torn apart and considerable dirt and foreign matter is released during the travel between the teeth.

The waste 25 drops down onto the conveyor belt 22 which is preferably of a chain type so as to have a plurality of interstices through which dirt may drop and thereby be removed from the waste as the belt 22 receives a more or less vibratory motion as it travels between its end pulleys 23 and 24. The belt 22 carries the waste 25 up and over the back edge of the tank 26 and discharges the waste therein. The tank 26 carries a steam-pipe 27 and has a tray or pan 28 mounted between the side walls at a substantial distance above the bottom of the tank. Just above the pan 28 is mounted a wire screen 29 onto which the waste 25 is dumped as above described.

Oil is put in the tank 26 to have its level above the screen 29 and is heated by means of the steam-pipe 27. A frame 30 is provided with a plurality of cross bars 31 from which depend a plurality of bars or rods 32. The frame 30 is supported by a flanged wheel 33 secured to each corner which normally rests on the top edge of the tank 26, the flanges of the wheels 33 being on the inside of the tank edges. In this position, the rods 32 depend to just above the screen 29.

Now to carry the waste 25 forwardly over the screen 29 from the place where it drops from over the end of the belt 22, the frame 30 is lifted upwardly, pulled backwardly and dropped down so as to permit some of the rods 32 to engage in the waste 25; the frame 30 then is moved ahead to cause the rods 32 to drag the waste 25 ahead over the screen 29 through the heated oil, after which the frame 30 is raised at its forward end of travel to pull the rods 32 out of contact with the waste 25 to be returned to drop the rods 32 to engage in more waste 25 and drag it ahead again in a similar manner.

To obtain such action, a horizontal section of track 34 is mounted on the tank 26 at each corner of the frame 30 at a distance above the edge of the tank equal to the distance it is desired to lift the rods 32 from the screen 29. An inclined section of track 35 is hinged to the forward end of each of the tracks 34 to rest by its forward end on the tank edge. Spaced back of each of the tracks 34 and secured to the tank 26 is a guide 36.

An eccentric 37 having a throw equal to the desired horizontal travel of the frame 30 is mounted, one near each end of a transverse shaft 38, and actuates the frame 30 through the connecting rod 39. Assuming the frame 30 to be in its normal lowered position with the wheels 33 resting on the tank edges, the shaft 38 is revolved in a continuous direction, and as the eccentrics 37 push the frame 30 forwardly, the wheels 33 will contact the inclined tracks 35 from their under sides, raise them, roll ahead and permit the tracks 35 to drop down behind them onto the tank edges, at which time the eccentrics 37 have brought the frame 30 to its forward end of travel and start pulling it backwardly, whereupon the wheels 33 striking the forward sides of the tracks 35 will roll up onto the tracks 34 to elevate the frame 30 as the eccentrics continue to pull it backwardly. Then as the frame 30 approaches its backward limit of travel, the wheels 33 drop off from the rear ends of the tracks 34 to be guided back down onto the tank edges below, correspondingly dropping the frame 30.

The action produced is comparable to that of manipulating a rake. The waste being in the heated oil, is just upon the point of floating and is easily raked along through the oil and in being so pulled through the oil the waste is well heated, the old oil loosened up and washed out, and particles of dirt are released which may drop through the screen 29 onto the pan 28.

To carry the waste on ahead from the forward end of travel of the rods 32, a second conveying means is employed which not only actually moves the waste along over the screen 29 but moves the waste backwardly and forwardly over the screen and performs the important operation of loosening or pulling the waste apart in the presence of the heated oil. This second conveying means generally termed herein as a picking and conveying means consists of a frame having the side members 40 supporting the cross-shafts 41, and a plurality of pairs of picking rods 42 and 43 pivotally mounted on the shafts.

Reference is made to Figs. 6, 7, and 8 wherein the picking and conveying means is shown on a larger scale. The rods 42 are each pivoted to have a short length extending up beyond the pivot point to carry a yoke 44. The rods 43 are pivoted on the same centers as those of the rods 42, but each rod 43 has a shorter upper arm which is offset backwardly and carries a yoke 45 on its upper terminal end. As above indicated, the rods 42 and 43 are in pairs—that is one rod 42 and one rod 43 constitute a pair to swing on a common pivot side by side. As in Fig. 6, these pairs of rods are staggered, and links 46 pivotally connect the yokes 44 in each of the longitudinal rows, so that when one of the rods 42 rocks on its pivot the same motion is imparted to all other rods 42 in the same row.

Likewise links 47 pivotally interconnect all of the yokes 45 in each of the longitudinal rows whereby all of the rods 43 will be rocked alike. A transverse shaft 48 is carried by all of the yokes 44 on the extreme front transverse row of rods 42, and a similar shaft 49 interconnects all of the yokes 45 on the extreme front transverse row of rods 43, the shaft 49 lying below the links 46 and behind the front row of rods 42.

The rods 42 and 43 are rocked by means of an eccentric 50, one carried near each end of the transverse shaft 51, through the connecting rod 52 engaging with the yoke connecting shaft 48, and a link 53 pivotally secured to the connecting rod 52 engaging with the lower shaft 49. Now as the eccentrics 50 are turned by revolving the shaft 51 from the solid line position to the dash line position, as in Fig. 8, the rods 42 and 43 will be rocked from the forwardly pointing positions to the rearwardly pointing positions shown by dash lines, continued rotation of the shaft, of course bringing the rods back to the solid line position, and so on.

Particular attention is directed to the motion of these rods 42 and 43. Since the upwardly extended arms of the rods 42 and 43 are of unequal length as above indicated, and the two sets of rods 42 and 43 are rocked by the same eccentric connecting rods, the rods 42 having the longer upper arms will be rocked through a greater arc than will be the rods 43, and therefore the rods 42 will actually pass the rods 43, by their lower ends and being in the waste, such action of the rods will actually pull the waste apart and at the same time drag the waste to and fro in the heated oil.

The action just described, being solely for agitating and pulling the waste apart, does not convey the waste ahead, and to impart the conveying motion to this picking means just described, a cam 54 is positioned one near each end of each side member 40, the two forward cams being secured to the forward transverse shaft 55 and the two rear cams to the rear transverse shaft 56. By suitable rotation of the shafts 55 and 56 the cams 54 are turned to raise the side members 40 causing the rods 42 and 43 (still being rocked) to be elevated, as in Fig. 7.

It is essential that the lifting of the rods 42 and 43 be timed so that the lifting occurs only at the point when the rods 42 and 43 are at their extreme forward end of travel, as in Fig. 8. The cams 54 are turned on over and timed to permit the rods 42 and 43 to drop back down into engagement with the waste only when the rods 42 and 43 are rocked back to the dash line positions as in Fig. 8. After lowering of the rods, they are rocked to and fro a predetermined number of times before again being elevated, so that the waste 25 is conveyed ahead only at the interval of the rods 42 and 43 being rocked ahead just preceding their elevation.

In the particular embodiment of the invention here described, the rods 42 and 43 are rocked to and fro four times between the time they are lowered and raised, and the timing of the lowering and raising in reference to such rocking is effected by a suitable chain drive 57 (Fig. 2) from a source of power, as an electric motor 58, the drive 57 being suitably reduced in speed from the shaft 51 to operate a jackshaft 59. A sprocket 60 is carried on one end of this shaft 59 to drive the chain 61 which in turn drives the sprocket 62 fitted to idle or turn freely on the forward cam shaft 55. A wheel 63 (Figs. 9, 10 and 11) is secured to the shaft 55 and has a lug 64 projecting therefrom toward the sprocket 62.

A finger 65 is secured to the chain 61 to project toward the wheel 63 so that as the chain 61 passes under and over the sprocket 62, the finger 65 will contact the lug 64, as in Figs. 9 and 11, and carry the wheel 63 around so as to revolve the shaft 59 to carry the cam from the dash line position in Fig. 9 to the solid line raised position in Fig. 10, thereby elevating the front ends of the side members 40.

A chain 66 (Fig. 2) twice the length of the chain 61 is driven from the other end of the jackshaft 59 and passes around a sprocket 67 turning on the corresponding end of the rear cam-shaft 56. A wheel 68 is secured to the cam shaft 56 and a lug projects toward the sprocket 67, all corresponding to the construction as above described as being on the opposite end of the forward cam shaft 55. However, as the chain 66 is twice the length of the chain 61 and operates at the same speed, it carries two fingers 69 equally spaced apart, one being positioned to contact the lug on the wheel 68 at the same time as the finger 65 contacts the lug 64 on the other wheel 63, so that the rear ends of the members 40 are raised simultaneously with the forward ends.

As the chains 61 and 66 travel on and carry the fingers away from the lugs, the wheels 63 and 68 are carried slightly past upper dead center to permit the weight of the side members 40 and of the other elements supported thereby to cause the cams 54 to be pressed downwardly to drop the members 40 to the normal lowered position.

A modified form may be employed as indicated in Fig. 12, where instead of having the cam 54 inside of the tank 26, the cam 54' is fixed to the extreme outer end of the shaft 55 on the outside of the tank and the sprocket 62 is carried between the cam 54' and the tank 26, so as to dispense with the wheel 63 or 68, as the case may be, and the lug 64 is secured directly on the cam 54' with the chain finger 65 reversed in position so as to permit contacting the lug 64. In this construction, a bracket 70 rests by its outer end on the cam 54' and passes upwardly and over the sprockets to be secured to the cross member 40. It is self evident that the cam 54' could be placed between the sprocket and the tank instead of as shown. The vertical guides 74, 75, 76, and 77 prevent endwise displacement of the member 40.

In Fig. 13, a modified form of mechanism for raising and lowering the members 40 is shown which eliminates the cams 54 and their shafts 55 and 56. In this modified form, a toggle-joint construction is employed. A link 71, pivoted by its lower end to near the bottom of the tank 26, is hingedly engaged by its upper end to the lower end of the link 72 by the pin 73, the link 72 being pivotally secured to near the rear end of the member 40. Similarly links 78 and 79 are mounted at the front end of the member 40 and hinged at their mutually contacting ends by the pin 80.

A tie-bar 81 pivotally interconnects the two pairs of links by the pins 73 and 80, and a connecting rod 82, engaged by its rear end also by the pin 80 is pivotally secured by its other end to the crank pin 83 on the wheel 84. When the wheel 84 is revolved, the links 71 and 72, and 78 and 79 travel between the limits as shown in Fig. 13, as the solid-line positions and the dash-line positions. Rollers 85 are mounted in the ends of the members 40 to reduce the friction on the guides 74, 75, 76 and 77 arising from the thrust set up by the toggle-joint arrangement.

The wheel 84 is timed in relation to the eccentric-shaft 51 through the chains 86 and 87 to raise and lower the members 40 with the supported rods 42 and 43 to give the same period of operation as above described in reference to the timing of the cams 54. The same toggle-joint construction as above described and as is shown on the one side of the tank 26, is duplicated on the other side of the tank 26 (not shown) so that both members 40 are raised and lowered simultaneously.

The screen 29 as before indicated extends from the rear end of the tank 26, where the waste 25 is first dumped onto it, to terminate near the forward end of the tank 26 at a point just at the forward limit of travel of the forward row of rods 42. A chain conveyer belt 88 travels upwardly and away from the forward end of the screen, Figs. 1, 7 and 8, and receives thereon the waste 25 as it is moved forwardly by the rods 42 and 43. The belt 88 carries the waste up out of the oil in the tank 26 and discharges it to be caught and carried through between the rolls 89 and 90 of the wringer 91, where most of the oil is pressed from the waste.

From the wringer 91, the waste 25 drops into a second tank 92 to go through what may appropriately be termed the rinsing operation. The tank 92 has a screen 93 horizontally positioned above its bottom with a pan 94 thereunder as in the tank 26. Oil is placed in the tank 92 and heated by the steam pipe 95.

A picker and conveyer mechanism is provided in the tank 92 which carries a plurality of pairs of picker rods 96 and 97 corresponding in detailed construction and operation exactly to the rods 42 and 43 employed in the tank 26, the rods 96 and 97 being carried in the tank 92 between the side members 98 and rocked to and fro by the eccentrics 99 to pick and stir the waste in the heated oil. The members 98 are raised and lowered in timed sequence with the travel of the eccentrics 99 exactly the same as are the members 40 in the tank 26.

A chain conveyer belt 101 receives the waste 25 as it passes forwardly over the end of the screen 93 and carries it upwardly out of the oil to discharge the waste to between the rollers 102 and 103 of the wringer 104, from which wringer the waste 25 is permitted to discharge into some receptacle as the barrel 105. The waste is then in condition for use again in packing journal-boxes. After coming from the last wringer 104, the waste, when held for use or shipped to various points, is preferably kept under oil to prevent heating.

While the invention which has been described in detail here has a certain structural form, it is entirely obvious that many variations in the structure may be made without departing from the spirit of the invention, and we therefore do not desire to be limited to the precise structure, nor any more than may be necessitated by the following claims.

We claim:

1. In a machine for cleaning waste over a floor in the presence of oil, a waste stirring and picking device having a plurality of pairs of picker rods, means for rocking the pairs of rods whereby one of the rods in each pair will swing past the other rod in that pair, and means for elevating and lowering said picker rods over the floor in timed relation to the rocking of said rods.

2. In a machine for cleaning waste, a waste stirring and picking device having a plurality of picker rods, a shaft pivotally carrying the rods, said rods being mounted in pairs, and means for swinging the rods to and fro, one of said rods in each pair being swung in an arc smaller than that of the second rod in that pair whereby the travel of the lower end of the second rod extends beyond both ends of the travel of the lower end of the first rod.

3. In a machine for cleaning waste, a waste stirring and picking device having a plurality of picker rods, a shaft pivotally carrying the rods, said rods being mounted in pairs, and means for swinging the rods to and fro, one of said rods in each pair being swung in an arc smaller than that of the second rod in that pair whereby the travel of the lower end of the second rod extends beyond both ends of the travel of the lower end of the first rod, and means for raising said picker rods when at one end of their travel and for lowering said rods when in their opposite ends of travel.

4. In a machine for cleaning waste, a frame, a plurality of picker rods pivotally carried by the frame, said rods being mounted in pairs and one of the rods in each pair having a long actuating arm and the second rod in each pair having a short actuating arm, an eccentric adapted to swing said rods, and a connecting rod from the eccentric interconnected with said long actuating arms and said short actuating arms whereby said second rods in each pair are caused to have their lower ends swing through an arc, and said first rod lower ends are caused to swing through an arc longer than the arc of said second rods.

5. In a machine for cleaning waste, a frame, a plurality of picker rods pivotally carried by the frame, said rods being mounted in pairs and one of the rods in each pair having a long actuating arm and the second rod in each pair having a short actuating arm, an eccentric adapted to swing said rods, and a connecting rod from the eccentric interconnected with said long actuating arms and said short actuating arms whereby said second rods in each pair are caused to have their lower ends swing through an arc, and said first rod lower ends are caused to swing through an arc longer than the arc of said second rods, all of said rods being oscillated simultaneously in the same directions, and elevating means lifting said frame when said rods are at the extreme end of travel in one direction, said elevating means lowering the frame when said rods are at the extreme end of travel in the opposite direction.

6. In a machine for cleaning waste, a waste stirring and picking device having a plurality of picker rods, means for pivotally supporting the rods, said rods being mounted in pairs, and means for swinging the rods to and fro, one of said rods in each pair being swung in an arc smaller than that of the second rod in that pair whereby the travel of the lower end of the second rod extends beyond both ends of the travel of the lower end of the first rod, and means for raising said picker rods when at one end of their travel and for lowering said rods when at their opposite ends of travel, and timing means associated with said raising and lowering means operating in relation to the rocking of said rods whereby said rods may be oscillated a predetermined number of times after said frame is lowered and before the frame is lifted.

7. In a machine for cleaning waste, a frame, a plurality of picker rods pivotally carried by the frame, said rods being mounted in pairs and one of the rods in each pair having a long actuating arm and the second rod in each pair having a short actuating arm, an eccentric adapted to swing said rods, and a connecting rod from the eccentric interconnected with said long actuating arms and said short actuating arms whereby said second rods in each pair are caused to have their lower ends swing through an arc, and said first rod lower ends are caused to swing through an arc longer than the arc of said second rods, all of said rods being oscillated simultaneously in the same directions, and elevating means lifting said frame when said rods are at the extreme end of travel in one direction, said elevating means lowering the frame when said rods are at the extreme end of travel in the opposite direction, and timing means associated with said raising and lowering means operating in relation to the rocking of said rods whereby said rods may be oscillated a predetermined number of times after said frame is lowered and before the frame is lifted.

8. In a machine for cleaning waste in the presence of oil, a tank, a floor supported in the tank, a plurality of conveyer fingers fixed in position in relation one to the other supported to depend toward the floor at one end of the tank, reciprocating means for passing said fingers along at a fixed constant distance above said floor away from said end of the tank and for returning said fingers to the initial position, elevating means for lifting and holding the fingers at a predetermined distance above the floor on the return travel, a set of conveyer and picking fingers rockably positioned to depend toward the floor between said first fingers and the opposite end of the tank, means for rocking said conveyer and picking fingers, and elevating means timed to raise and lower said conveyer and picking fingers after a predetermined period of rocking.

9. In a machine for cleaning waste in the presence of oil, a tank adapted to hold oil, means for stirring the waste in one direction through a portion of the tank and means for stirring the waste backwardly and forwardly and then moving the waste along through the tank from said first means.

10. In a machine for cleaning waste, a stirring and conveying mechanism comprising a tank, a frame guided to be moved to and fro over the tank, a plurality of finger rods fixed to the frame and depended in said tank, means for reciprocating said frame, a track elevated above said tank, and a second track hinged to said elevated track to form an incline from the tank to the elevated track, said frame being guided up said incline onto said track to raise the frame as the frame travels in one direction to drop off the other end of the track back down toward the tank and pass thereunder, raise, and drop the incline track behind as the frame travels on the lower level back to the initial position.

11. In a machine for cleaning waste in the presence of oil, a tank adapted to hold oil, means for stirring the waste in the oil, and means for stirring and pulling apart the waste.

12. In a machine for cleaning waste, a tank adapted to hold oil, means for pulling apart and loosening the waste comprising a plurality of fingers pivoted together in pairs and adapted to engage the waste in the oil, and means for moving the fingers of each pair apart one from the other, and means giving all of said fingers a relative motion toward one end of the tank during said moving of the individual fingers.

13. In a machine for cleaning waste, a tank adapted to hold oil, means for pulling apart and loosening the waste comprising a plurality of fingers pivoted together in pairs and adapted to engage the waste in the oil, and means for moving the fingers of each pair apart one from the other and means for disengaging all of the fingers from the waste.

14. In a machine for cleaning waste, a tank adapted to hold oil, means for pulling apart and loosening the waste comprising a plurality of fingers pivoted together in pairs and adapted to engage the waste in the oil, and means for moving the fingers of each pair apart one from the other, all of said fingers being given a relative motion toward one end of the tank during said moving of the individual fingers and means for disengaging the fingers from the waste.

15. In a machine for cleaning waste, a tank adapted to hold oil, means for pulling apart and loosening the waste comprising a plurality of fingers adapted to engage the waste in the oil, and means for moving transversely alternate fingers apart one from the other and means for disengaging the fingers from the waste and for causing the fingers to re-engage with the waste with the fingers in relatively different positions than when first disengaged.

16. In a machine for cleaning waste, a tank adapted to hold oil, a plurality of fingers projecting to within the tank, said fingers being arranged in a plurality of pairs transversely across the tank and said pairs being arranged in a plurality of groups longitudinally of the tank, and means for moving apart the fingers one from another in each pair, and means for moving all of said groups one with the other in the same direction.

In testimony whereof we affix our signatures.

IRVIN M. CONWAY.
THOMAS M. LAWSON.